(12) United States Patent
Schumann

(10) Patent No.: US 11,400,953 B2
(45) Date of Patent: Aug. 2, 2022

(54) METHOD AND PRODUCT FOR ALERTING OR REFOCUSING AN INATTENTIVE DRIVER

(71) Applicants: Continental Automotive Systems, Inc., Auburn Hills, MI (US); Steering Solutions IP Holding Corporation, Auburn Hills, MI (US)

(72) Inventor: Clinton L. Schumann, Holly, MI (US)

(73) Assignees: Continental Automotive Systems, Inc., Auburn Hills, MI (US); Steering Solutions IP Holding Corporation, Auburn Hills, MI (US)

(*) Notice: Subject to any disclaimer, the term of this patent is extended or adjusted under 35 U.S.C. 154(b) by 1 day.

(21) Appl. No.: 17/075,018

(22) Filed: Oct. 20, 2020

(65) Prior Publication Data

US 2021/0129861 A1    May 6, 2021

Related U.S. Application Data

(60) Provisional application No. 62/928,117, filed on Oct. 30, 2019.

(51) Int. Cl.
*B60Q 1/00* (2006.01)
*B60W 50/14* (2020.01)
*B60W 40/09* (2012.01)

(52) U.S. Cl.
CPC ............ *B60W 50/14* (2013.01); *B60W 40/09* (2013.01); *B60W 2050/143* (2013.01); *B60W 2420/42* (2013.01); *B60W 2540/221* (2020.02); *B60W 2540/223* (2020.02); *B60W 2540/229* (2020.02); *B60W 2720/106* (2013.01); *B60W 2720/125* (2013.01)

(58) Field of Classification Search
CPC ................ B60W 50/14; B60W 40/09; B60W 2050/143; B60W 2420/42; B60W 2540/221; B60W 2540/223; B60W 2540/229; B60W 2720/106; B60W 2720/125; B60W 50/16; B60W 2040/0827; B60W 10/22; B60W 40/08; B60W 2540/225; B60W 2710/22
USPC ................ 340/439, 438, 457, 429, 440, 441
See application file for complete search history.

(56) References Cited

U.S. PATENT DOCUMENTS

| | | | |
|---|---|---|---|
| 7,126,485 B2* | 10/2006 | Cece ...................... | G08B 21/06 340/576 |
| 9,988,055 B1* | 6/2018 | O'Flaherty ........... | B60W 40/08 |
| 10,421,465 B1* | 9/2019 | Jutkowitz ............. | B60W 50/16 |
| 2011/0284304 A1* | 11/2011 | Van Schoiack ........ | B62D 1/046 180/272 |
| 2016/0280181 A1* | 9/2016 | Poisner ................. | A63F 13/798 |
| 2018/0268695 A1* | 9/2018 | Agnew ................ | G05D 1/0055 |
| 2019/0039648 A1* | 2/2019 | Kitta .................... | B62D 5/0463 |
| 2020/0364476 A1* | 11/2020 | Yoshizaki .......... | G06K 9/00832 |

* cited by examiner

*Primary Examiner* — Anh V La
(74) *Attorney, Agent, or Firm* — Brooks Group, PLC

(57) ABSTRACT

A number of illustrative variations may include a method or product for alerting or refocusing an inattentive driver.

19 Claims, 3 Drawing Sheets

METHOD AND PRODUCT FOR ALERTING OR REFOCUSING AN INATTENTIVE DRIVER

CROSS-REFERENCE TO RELATED APPLICATIONS

This application claims the benefit of U.S. Provisional Application Ser. No. 62/928,117 filed Oct. 30, 2019.

TECHNICAL FIELD

The field to which the disclosure generally relates includes driver and vehicle interfacing.

BACKGROUND

Vehicles typically include as steering system comprising a steering interface that a human driver may use to steer the vehicle. Even in autonomous vehicles, there may arise driving situations that a human driver may be better suited to handle.

SUMMARY OF ILLUSTRATIVE VARIATIONS

A number of illustrative variations may include a method or product for alerting or refocusing a human driver that is inattentive to the task of driving.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
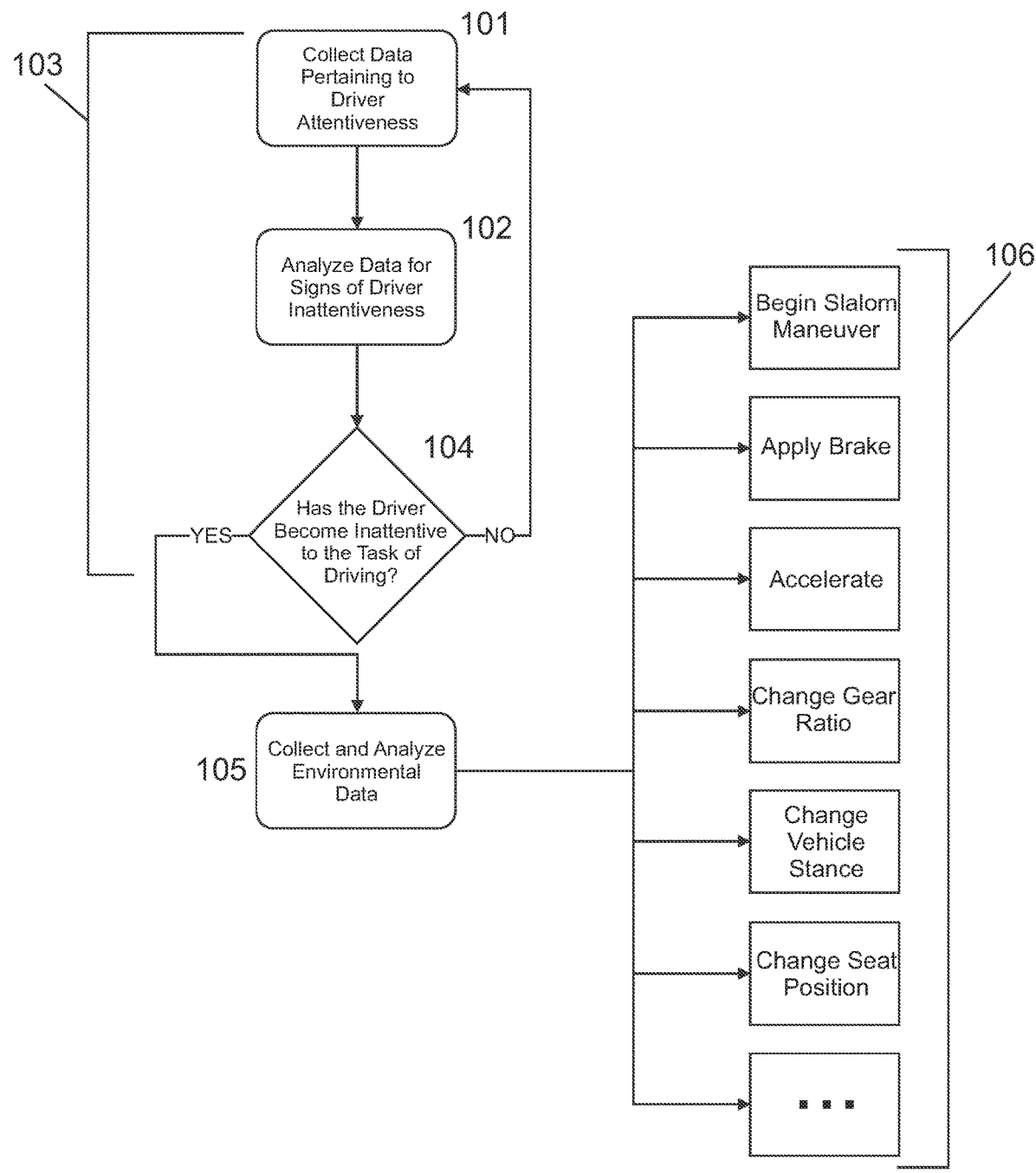
FIG. 1 depicts an illustrative variation in which a flow chart depicts generally how a human driver's inattentiveness may be detected and handled by the human driver monitoring system based upon a number of example conditions.

The following description of the variations is merely illustrative in nature and is in no way intended to limit the scope of the invention, its application, or uses.

In a number of illustrative variations, a vehicle for cargo or passengers may be driven ahead by an automotive power derived from a motor that transforms a source of stored energy into a driving force for the vehicle such as but not limited to an internal combustion engine, a battery powered engine, a fuel-cell powered engine, or any other known motor for providing automotive driving power for a passenger or cargo vehicle. The driving force that results from the transformation of stored energy by the motor may be communicated from the motor to a driving medium along which the vehicle will travel such as but not limited to a tract of land, a road, a waterway, an airway, or any other medium along which vehicles are known to travel through space. The communication of the driving force from the motor to the driving medium may occur via any means of driven automotive vehicle movement such as but not limited to roadwheels, treads, casters, rollers, propellers, gas thrusters, liquid thrusters, or ion driven thrusters, or any other known means of driven automotive vehicle movement.

As used herein, "wheels" or "wheel," even when modified by a descriptive adjective such as but not limited to in the recitation of "steerable roadwheels," "steerable wheels," "road wheels," or "driven wheels," may refer to a traditional road wheel and tire arrangement, but may also refer to any modification to the traditional road wheel and tire arrangement such as but not limited to rimless mag-lev tires, ball tires, or any other known means of automotive movement such as but not limited to treads, casters, rollers, propellers, or gas thrusters, liquid thrusters, or ion driven thrusters.

As used herein, "road," even when modified by a descriptive adjective may refer to a traditional driving surface road such as but not limited to a concrete or asphalt road but may also refer to any driving surface or medium along which or through which a vehicle for cargo or passengers may travel such as but not limited to water, ice, snow, dirt, mud, air or other gases, or space in general.

In a number of illustrative variations, the phrase "driving a vehicle" or "driving the vehicle" may refer to the task of competently operating the vehicle in any manner of way that may affect vehicle travel, including but not limited to steering the vehicle via a steering interface, causing the vehicle to accelerate via any available systems such as but not limited to a throttle, causing the vehicle to decelerate via any available systems such as but not limited to a braking system or transmission, causing the vehicle to change driving modes such as but not limited to change the performance goals or limits of the vehicle or emissions goals or limits via any available interface for doing so, changing the stance of the vehicle via an active suspension system, where present, via any interface available for doing so.

In a number of illustrative variations, a vehicle may have a steering system that allows a human driver to change the vehicle's direction or divert it from a path that it may be traveling in. The vehicle's steering system may also be autonomous in that the vehicle may steer itself toward a predetermined location that has been communicated to it without assistance or interference from a driver. The vehicle may also include an obstacle avoidance system that allows the vehicle to sense objects in its path and avoid them.

In a number of illustrative variations, a vehicle may be equipped with a steering interface that may comprise a joystick, a trackball, a slider, a throttle, a pushbutton, a toggle switch, a lever, a touchscreen, a mouse, or any other known means of user input. In cases where human driver input is via a human driver's interaction with a steering interface that yields no obvious opportunity for force feedback, such as but not limited to variations involving a mouse or touchscreen as a primary means of human driver input, the automated steering system may indicate resistance to human driver input via visual cues such as but not limited to a flash or an animation on a display, audio cues such as but not limited to clicks, beeps, or an instructive voice recording, generated voice, or live voice, or haptic cues such as but not limited to vibration of a screen, or any other cue that may indicate to the human driver how human driver input— which may be concurrent with autonomous input—is being opposed, cooperated with, integrated or handled by the steering system.

In a number of illustrative variations, an vehicle may be equipped with a number of systems that may be programmed with or be in communication with any number of logic modules arranged to autonomously address a number of areas of control within the realm of vehicle steering and travel including but not limited to vehicle acceleration, vehicle braking, autonomous path planning, performance capability monitoring and management, and an autonomous steering system for at least lateral control of the vehicle. The logic for the modules of the autonomous steering system may account for human driver assistance or intervention in the steering or driving of the vehicle.

In a number of illustrative variations, a vehicle may be equipped with a number of systems that may be programmed with or in communication with any number of logic modules that monitor the state of a human driver or passenger of the vehicle. Such systems or logic modules may monitor the biometric data such as but not limited to heat signature or heart rate, posture data such as but not limited to slumping of the shoulders or arching of the back, movement data such as but not limited to movement of the eyes, stillness of the mouth, or movement of the feet, emissions data such as but not limited to sound or gas emissions, component interaction data such as but not limited to grip strength or lightness of touch, or gesture data. Any data that may be used to determine the attentiveness of a human driver may be collected by such systems and processed by such modules using appropriate sensors, systems, or cameras such as but not limited to gas composition sensors, touch or pressure sensors of any kind, sound sensors or microphones, infrared cameras, ultrasound systems, or radar systems. Importantly, image analysis may be used on any images collected by cameras to determine things such as but not limited to stillness of the mouth, movement of the eyes, slumping of the shoulders, movement of the feet, arching of the back, or gestures of the driver.

In a number of illustrative variations, the systems or components of a vehicle or any combinations thereof may operate according to logic modules by way of software or machine logic. In such cases, any number of modules may be combined together or broken into smaller modules.

In a number of illustrative variations, a human driver monitoring system may detect that a human driver has become inattentive to the task of driving a vehicle by becoming drowsy or distracted, or otherwise, and determine that it is appropriate to jolt the human driver back to a state of attention. In some such cases, such a jolt to the human driver may be affected by way of changing the acceleration of the vehicle in either the lateral or longitudinal direction. In some cases, such a jolt may also be achieved by changing the position or orientation of the human driver's seat quickly or in any other manner that would likely alert and refocus the human driver.

In a number of illustrative variations, a vehicle may be equipped with an autonomous steering system that may autonomously control the lateral movement of the vehicle via systems such as but not limited to a steering system, an engine control system, a braking system, a drivetrain system, or any other vehicle system. In some such cases, a human driver monitoring system may detect that a human driver has become inattentive to the task of driving the vehicle and may begin slaloming the vehicle within a driving lane so as to create a lateral force on the human driver in order to alert and refocus the human driver that has been determined to be inattentive to the task of driving the vehicle.

In a number of illustrative variations, the vehicle may be equipped with an active suspension system, capable of actively changing the stance of the vehicle, and the vehicle stance may be actively changed by a human driver monitoring system via the active suspension system. In some such cases, a human driver monitoring system may detect that a human driver has become inattentive to the task of driving the vehicle and change the stance of the vehicle via the active suspension system so as to alert and refocus the human driver that has been determined to be inattentive to the task of driving the vehicle by the human driver monitoring system. In some such cases, the autonomous steering system of the vehicle may account for and mitigate any changes to steering that this stance change may cause even as the alerted and refocused human driver reassumes the task of driving the vehicle. As a non-limiting example, if the change in vehicle stance made by the human driver monitoring system is a drop in the front and rear driver-side suspension, relatively lower than the suspension on front and rear passenger-side, this may cause a dropping feeling for the human driver but may also cause the vehicle to veer left or right due to the suspension differential. In such a case, the autonomous steering system may account for any such veering and steer the vehicle such that it maintains its pre-stance-change bearing. Further, should the human driver reassume the task of driving the vehicle via interaction with at least one steering interface before the human driver monitoring system remedies the suspension differential, the autonomous steering system may assist the human driver in steering the vehicle by adaptively maintaining a straightforward bearing for the home or center position of the steering interface. As a non-limiting example, in a case in which at least one steering interface by which the human driver reassumes the task of driving is a handwheel, the autonomous driving system may assist the human driver during the described stance-change alert procedure by ensuring that, whenever the handwheel is centered, the vehicle is travelling on a straightforward bearing.

In a number of illustrative variations, a vehicle may be equipped with a braking system constructed and configured to brake at least one steerable roadwheel or at least one driven roadwheel of the vehicle. In some such cases, a human driver monitoring system may detect that a human driver has become inattentive to the task of driving the vehicle and may brake at least one steerable roadwheel or driven roadwheel to change the acceleration of the vehicle so as to alert and refocus the human driver that has been determined to be inattentive to the task of driving the vehicle. In some such cases, a roadwheel may be a driven and steerable roadwheel and may be braked by the braking system.

In a number of illustrative variations, a vehicle may be equipped with a transmission constructed and arranged to change a gear ratio of an engine shaft to drive shaft, thus changing the rotations-per-minute of at least one driven roadwheel so as to alert and refocus a human driver that has been determined to be inattentive to the task of driving the vehicle by a human driver monitoring system. In some such cases, the human driver monitoring system may detect that a human driver has become inattentive to the task of driving the vehicle and may utilize the transmission to shift gears in a manner that affects the rotations per minute of at least one driven roadwheel so as to alert and refocus a human driver that has been determined to be inattentive to the task of driving the vehicle.

In a number of illustrative variations, a human driver monitoring system may detect that a human driver has become inattentive to the task of driving the vehicle and may communicate this to any number of systems or modules of the vehicle. A module concerning engine control may induce the engine to adjust the amount of torque delivered to at least one driven roadwheel, thus affecting the acceleration of that driven roadwheel so as to create a lurching sensation in a human driver in order to alert and refocus a human driver that has been determined to be inattentive to the task of driving the vehicle.

In a number of illustrative variations, a vehicle may also be equipped with an autonomous driving system that may comprise the autonomous steering system as well as any other system that may pertain to movement of the vehicle in any direction such as but not limited to signaling systems, autonomous path planning and following systems, cruise systems, blind spot management systems, legal compliance systems, suspension systems, crash avoidance systems, etc. In some such cases, the human driver monitoring system may detect that a human driver has become inattentive to the task of driving the vehicle and may utilize any system comprising the autonomous driving system in a manner appropriate for alerting and refocusing a human driver that has been determined to be inattentive to the task of driving the vehicle.

In a number of illustrative variations, any of the change made to alert and refocus a human driver may be preceded by a warning sequence such as but not limited to an audible alarm such as but not limited to a chiming noise that may grow in loudness as plays in the vehicle cabin. In some cases, the change made to alert and refocus the human driver may be preceded by a vibration of one or more of the vehicle components such as but not limited to a seat or a steering interface. Such a vibration or buzzing may also grow in intensity as it occurs. Any such preceding warning sequences may also proceed through or occur concurrently with the change intended to alert and refocus the inattentive human driver.

In a number of illustrative variations, any number of methods described in the disclosure may be utilized to alert an attentive human driver to assume the task of driving the vehicle regardless of the fact that the vehicle has not been determined by the human driver monitoring system to be inattentive to the task of driving the vehicle. In some such cases, this may occur because any number of vehicle modules, systems, components, cameras, or sensors have been used by the vehicle to determine that the vehicle needs a human pilot to navigate an upcoming section of the vehicle path for reasons such as but not limited to the detection of a particularly intricate or difficult portion of road for the vehicle's autonomous driving systems to navigate such as but not limited to a roundabout or exit ramp, detection of inclement weather or any other atmospheric condition that may adversely affect the function of the vehicle modules, systems, components, cameras, or sensors such as but not limited to smoke, water, snow, ice, electromagnetic interference, or any other condition known to adversely affect the function of vehicle modules, systems, components, cameras, or sensors. In some cases, any number of methods already described in the disclosure may be utilized to notify an attentive driver to assume the task of driving the vehicle regardless of the fact that the vehicle has not been determined by the human driver monitoring system to be inattentive to the task of driving the vehicle due to a system fault that occurs regardless of travel conditions, but nonetheless adversely affects the function of vehicle modules, systems, components, cameras, or sensors.

In a number of illustrative variations, the vehicle may be equipped with any number of sensors or cameras configured to detect a change in the stability or safety of travel for the vehicle. Such sensors or cameras may be used in as part of a system or module for ensuring vehicle stability or safety with regard to vehicle travel. In some such cases, if a change which may be made to alert and refocus a human driver is determined by such a system to be likely to result in instability of the vehicle or reduction in safety of travel for the vehicle, the change may be avoided, minimized, or attenuated.

Referring now to the illustrative variation depicted in FIG. 1, a flow chart describing the logical flow of a method for alerting or refocusing an inattentive human driver is shown. At least one of the processes shown may be running concurrently with one another. In a first process 101 of a cycle 103, at least one sensor or camera is used to collect data pertaining to a human driver's attentiveness to the task of driving. In a second process 102 within the cycle 103, a human driver monitoring system (not shown) analyzes the data pertaining to the human driver's attentiveness to the task of driving. While cycle 103 continuously runs, condition 104 is continuously checked to determine whether a human driver (not shown) has become inattentive to the task of driving. If condition 104 is resolved in the negative, cycle 103 may simply continue to run. If condition 104 is answered in the positive, process 105 may collect and analyze data about the environment in which the vehicle (not shown) is driving. This data collection and analysis may occur by actively polling environmental sensors (not shown) for the vehicle or by accessing data already available via a memory or storage system for such data, or an electronic bus for such data. Depending upon the analysis of the environmental data according to process 105, at least one appropriate action for alerting and refocusing the human driver is selected and commenced in process 106. Potentially appropriate actions for alerting and refocusing the human driver in process 106 may include but are not limited to beginning a slalom maneuver for the vehicle, applying a vehicle brake for any amount of time, causing the vehicle to accelerated for any amount of time, changing a gear ratio via the vehicle transmission, changing the vehicle stance, changing the position of the human driver's seat, or any other action that might conceivably alert and refocus a human driver.

Figure 2:
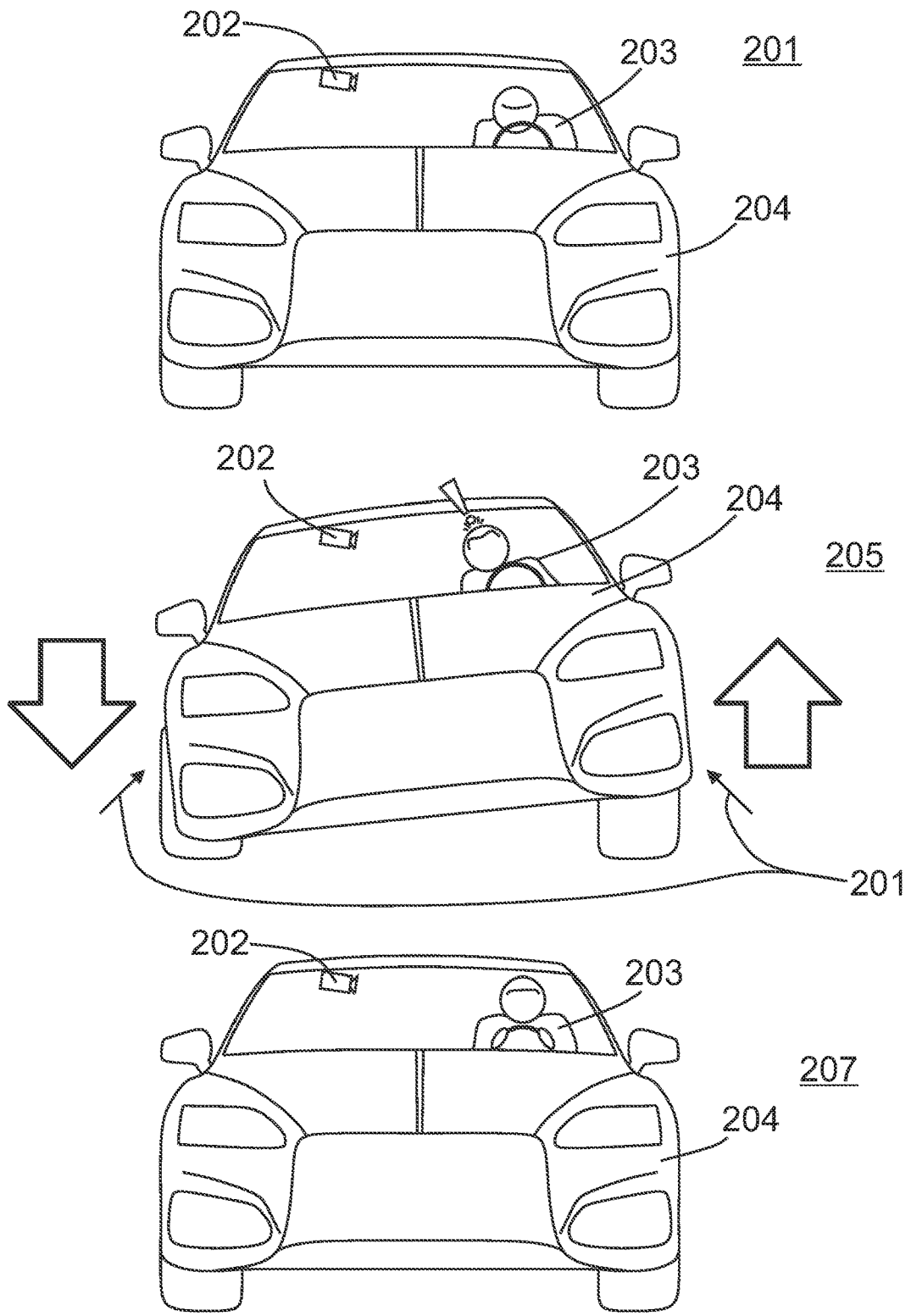
FIG. 2 depicts an illustrative variation in which the stance of a vehicle is changed in order to alert and refocus an inattentive human driver.

Referring now to the illustrative variation in FIG. 2, in a first step 201 a human driver monitoring system may comprise at least one camera or sensor 202 and may determine that a driver 203 has become inattentive to the task of driving a vehicle 204. In a second step 205, the human driver monitoring system may itself, or via any appropriate vehicle system, drop the vehicle's active suspension 206 on at least one side of the vehicle 204 and may also raise the active suspension 206 on an opposing side of the vehicle 204, in response to determining that that the human driver 203 has become inattentive. This may create a dropping or jumping sensation in the driver 203 in an attempt to alert and refocus the driver 203. This active suspension 206 manipulation may occur and reset repeatedly on the same side of the vehicle 204 or oscillate between opposite sides of the vehicle 204 until the human driver monitoring system comprising camera or sensor 202 determines that the driver 203 has been alerted and refocused and is attentive to the task of driving in step 207.

Figure 3:
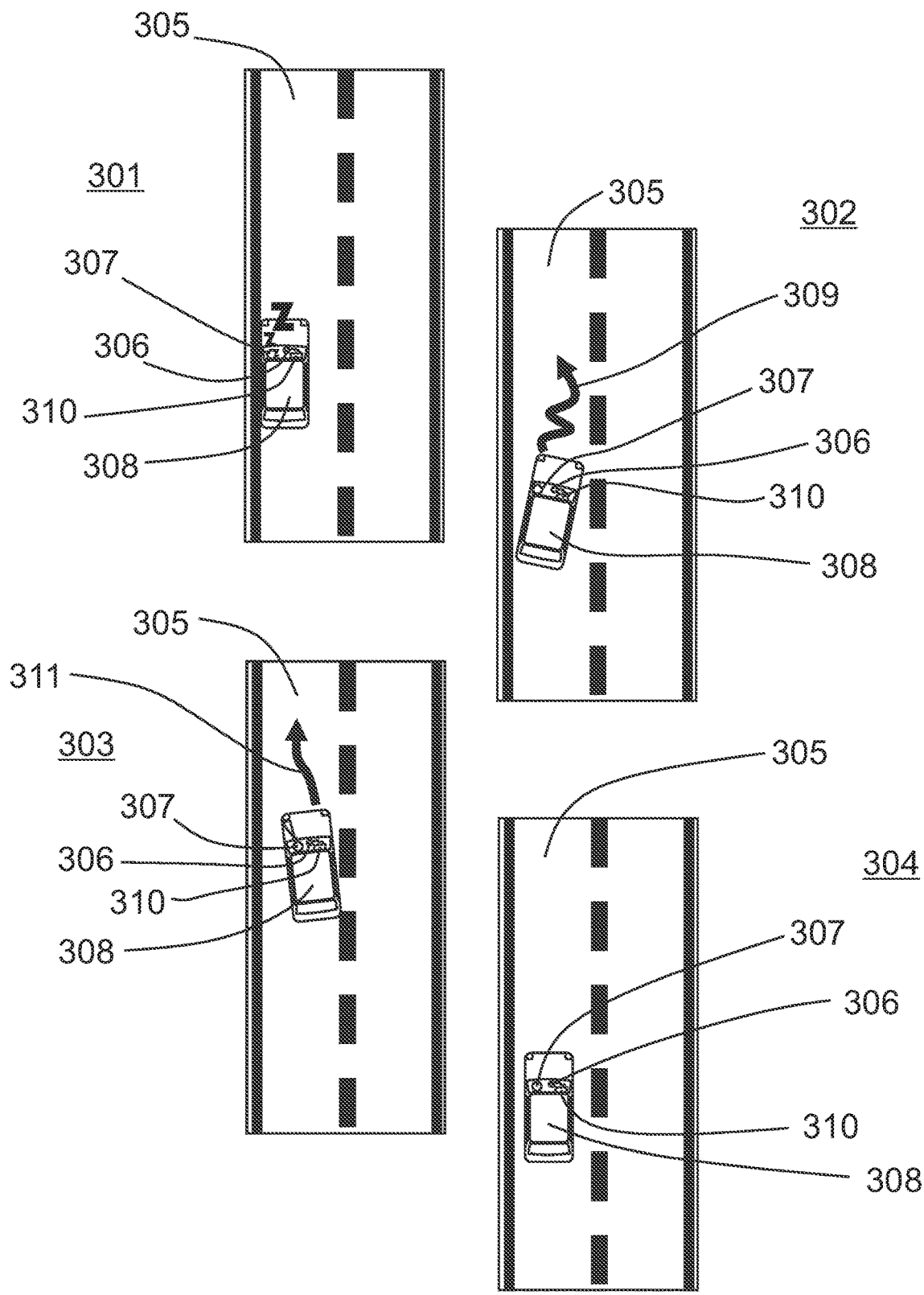
FIG. 3 depicts an illustrative variation in which a vehicle begins a slalom maneuver in order to alert and refocus an inattentive human driver.

Referring now to the illustrative variation depicted in FIG. 3, in a first step 301 a human driver monitoring system 310 may comprise at least one camera or sensor 306 and may determine that a human driver 307 has become inattentive to the task of driving a vehicle 308. In this illustrative variation, the camera or sensor 306 may be a microphone or biometric sensor that has detected that the human driver's 307 breathing has slowed, and the human driver monitoring system 310 has determined that the human driver 306 has fallen asleep. Following this determination by the human driver monitoring system 310, in a second step 302, the human driver monitoring system may initiate a slalom maneuver 309 within a driving lane 305 in an attempt to alert and refocus the human driver 307. Note that the slalom maneuver 309 may be more mild or more extreme as compared to the slalom maneuver 209 depicted in this illustrative variation. In a third step 303 the human driver monitoring system 310 detects via sensor or camera 306 that the human driver 307 has been alerted and refocused and induces the vehicle to cease the slalom pattern 209 and begin a straightening-out maneuver 311 within the diving lane 305. In a fourth step 304, the human driver monitoring system 310 may detect via the camera or sensor 306 that the human driver 307 has assumed the task of driving the vehicle 308 and ceases all alerting and refocusing actions aimed at the human driver 307.

The following description of variants is only illustrative of components, elements, acts, products and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a method comprising: providing a human driver monitoring system and a human driver jolting system for a vehicle; using the human driver monitoring system to monitor a human driver for signs of inattentiveness to the task of driving the vehicle; and, jolting the human driver;

Variation 2 may include any of the methods of variations 1, or 3-14 wherein jolting the vehicle driver is preceded by producing an alert signal within the vehicle cabin.

Variation 3 may include any of the methods of variations 2, or 4-14 wherein the alert signal is an audible alarm.

Variation 4 may include any of the methods of variations 1-3, or 5-14 wherein the human driver monitoring system comprises at least a camera.

Variation 5 may include any of the methods of variations 1-4 or 6-14 wherein the camera is an infrared camera.

Variation 6 may include any of the method of variations 1-5, or 7-14 wherein the human driver monitoring system comprises at least a pressure sensor imbedded in a vehicle component, an element of vehicle upholstery, or an element of vehicle trim.

Variation 7 may include any of the methods of variations 1-6, or 8-14 wherein the vehicle further comprises an active suspension system and wherein using the human driver jolting system to jolt the human driver comprises using the active suspension to change the stance of the vehicle.

Variation 8 may include any of the methods of variations 1-7, or 9-14 wherein the vehicle is in motion, and the motion of the vehicle comprises a longitudinal vehicle acceleration component and a lateral vehicle acceleration component.

Variation 9 may include any of the methods of variations 1-8, or 10-14 wherein using the human driver jolting system to jolt the human driver comprises changing the longitudinal vehicle acceleration component.

Variation 10 may include any of the methods of variations of 1-9, or 11-14 wherein using the human driver jolting system to jolt the human driver comprises changing the lateral vehicle acceleration component.

Variation 11 may include any of the methods of variations 1-10, or 12-14 wherein using the human driver monitoring system to monitor the human driver for signs of inattentiveness to the task of driving the vehicle comprises detecting that a human driver has closed its eyes.

Variation 12 may include any of the methods of variations 1-11, or 13-14 wherein using the human driver monitoring system to monitor the human driver for signs of inattentiveness to the task of driving the vehicle comprises detecting that a human driver has slowed its breathing.

Variation 13 may include any of the methods of variation 1-12, or 14 wherein using the human driver monitoring system to monitor the human driver for signs of inattentiveness to the task of driving the vehicle comprises detecting that a human driver has diverted its gaze.

Variation 14 may include any of the methods of variation 1-13 wherein using the human driver monitoring system to monitor the human driver for signs of inattentiveness to the task of driving the vehicle comprises detecting that a human driver has slumped its shoulders.

Variation 15 may include a product comprising: a human driver monitoring system for use in a vehicle constructed and arranged to monitor a human driver and to determine whether the human driver is inattentive to the task of driving a vehicle, and further constructed and arranged to communicate with at least one vehicle system, and to affect a change an acceleration of the at least one steerable roadwheel or the at least one driven roadwheel via communication with the at least one other vehicle system based at least upon the detection of whether the human driver is inattentive to the task of driving the vehicle.

Variation 16 may include the product of variation 15 wherein changing the acceleration of the at least one steerable roadwheel or the at least one driven roadwheel via communication with the at least one other vehicle system comprises communicating in order to affect a change the acceleration of a steerable roadwheel in a lateral direction by signaling a vehicle steering system to steer the at least one steerable roadwheel in the lateral direction with respect to a straight-forward bearing.

Variation 17 may include the product of variation 15 wherein changing the acceleration of the at least one steerable roadwheel or the at least one driven roadwheel via communication with the at least one other vehicle system comprises communicating in order to affect a change the acceleration of a driven roadwheel by signaling a vehicle engine system to increase an amount of torque supplied by the vehicle motor to a driven roadwheel.

Variation 18 may include the product of variation 15 wherein the human driver monitoring system is further constructed and arranged to communicate with a driving friction estimation system, wherein the driving surface friction estimation system is constructed and arranged to estimate a driving surface friction for at least one of the at least one driven roadwheel or steerable roadwheel, and wherein the human driver monitoring system is constructed and arranged to affect a change in the acceleration of the at least one steerable roadwheel or the at least one driven roadwheel via communication with the at least one other vehicle system based at least upon the determination of whether the human driver is inattentive to the task of driving the vehicle as well as the friction estimate for at least one of the at least one steerable roadwheel or the at least one driven roadwheel.

Variation 19 may include the product of variation 15 wherein the human driver monitoring system is further constructed and arranged to communicate with at least one vehicle system or module for detecting adverse driving environment, and wherein the human driver monitoring system is constructed and arranged to affect a change in the acceleration of the at least one steerable roadwheel or the at least one driven roadwheel via communication with the at least one other vehicle system based at least upon the detection of an adverse driving environment regardless of whether the human driver is determined to be inattentive to the task of driving by the human driver monitoring system.

Variation 20 may include a method comprising: providing at least one driven and steerable roadwheel constructed and arranged to be driven by torque supplied by a vehicle motor and also to be steered by a steering system, a human driver monitoring system, a driving surface friction estimation system, and a braking system constructed and arranged to brake at least one of the at least one driven or steerable roadwheel; using the human driver monitoring system to detect that a human driver has become inattentive to the task of driving the vehicle; using the driving surface friction estimation system to estimate a driving surface friction for at least one of the at least one driven or steerable roadwheel; and, based at least upon the detection of the inattentiveness of the human driver and the friction estimate for at least one of the at least one driven and steerable roadwheel, changing an acceleration of the at least one driven or steerable roadwheel.

The above description of select variations within the scope of the invention is merely illustrative in nature and, thus, variations or variants thereof are not to be regarded as a departure from the spirit and scope of the invention.

What is claimed is:

1. A method comprising:
providing a human driver monitoring system and a human driver jolting system for a vehicle;
using the human driver monitoring system to monitor a human driver for signs of inattentiveness to the task of driving the vehicle; and,
using the human driver jolting system to jolt the human driver,
and wherein the human driver monitoring system is further constructed and arranged to communicate with a driving friction estimation system, wherein the driving surface friction estimation system is constructed and arranged to estimate a driving surface friction for at least one of the at least one driven roadwheel or steerable roadwheel, and wherein using the human driver jolting system to jolt the human driver is based at least upon the determination of the friction estimate for at least one of the at least one steerable roadwheel or the at least one driven roadwheel.

2. The method of claim 1 wherein using the human driver jolting system to jolt the human driver is preceded by producing an alert signal within the vehicle cabin.

3. The method of claim 2 wherein the alert signal is an audible alarm.

4. The method of claim 1 wherein the human driver monitoring system comprises at least a camera.

5. The method of claim 4 wherein the camera is an infrared camera.

6. The method of claim 1 wherein the human driver monitoring system comprises at least a pressure sensor imbedded in a vehicle component, an element of vehicle upholstery, or an element of vehicle trim.

7. The method of claim 1 wherein the vehicle is in motion, and the motion of the vehicle comprises a longitudinal vehicle acceleration component and a lateral vehicle acceleration component.

8. The method of claim 7 wherein using the human driver jolting system to jolt the human driver comprises changing the longitudinal vehicle acceleration component.

9. The method of claim 7 wherein using the human driver jolting system to jolt the human driver comprises changing the lateral vehicle acceleration component.

10. The method of claim 1 wherein using the human driver monitoring system to monitor the human driver for signs of inattentiveness to the task of driving the vehicle comprises detecting that a human driver has closed its eyes.

11. The method of claim 1 wherein using the human driver monitoring system to monitor the human driver for signs of inattentiveness to the task of driving the vehicle comprises detecting that a human driver has slowed its breathing.

12. The method of claim 1 wherein using the human driver monitoring system to monitor the human driver for signs of inattentiveness to the task of driving the vehicle comprises detecting that a human driver has diverted its gaze.

13. The method of claim 1 wherein using the human driver monitoring system to monitor the human driver for signs of inattentiveness to the task of driving the vehicle comprises detecting that a human driver has slumped its shoulders.

14. A method comprising:
providing a human driver monitoring system and a human driver jolting system for a vehicle;
using the human driver monitoring system to monitor a human driver for signs of inattentiveness to the task of driving the vehicle; and,
using the human driver jolting system to jolt the human driver, wherein the vehicle further comprises an active suspension system and wherein using the human driver jolting system to jolt the human driver comprises using the active suspension to change the stance of the vehicle, and wherein the vehicle includes an autonomous system constructed and arranged to mitigate any changes to steering that the change in stance has caused.

15. A product comprising:
a human driver monitoring system for use in a vehicle constructed and arranged to monitor a human driver and to determine whether the human driver is inattentive to the task of driving the vehicle, and further constructed and arranged to communicate with at least one vehicle system, and to affect a change an acceleration of the at least one steerable roadwheel or the at least one driven roadwheel via communication with the at least one other vehicle system based at least upon the detection of whether the human driver is inattentive to the task of driving the vehicle, wherein the human driver monitoring system is further constructed and arranged to communicate with a driving friction estimation system, wherein the driving surface friction estimation system is constructed and arranged to estimate a driving surface friction for at least one of the at least one driven roadwheel or steerable roadwheel, and wherein the human driver monitoring system is constructed and arranged to affect a change in the acceleration of the at least one steerable roadwheel or the at least one driven roadwheel via communication with the at least one other vehicle system based at least upon the determination of whether the human driver is inattentive to the task of driving the vehicle as well as the friction estimate for at least one of the at least one steerable roadwheel or the at least one driven roadwheel.

16. The product of claim 15 wherein changing the acceleration of the at least one steerable roadwheel or the at least one driven roadwheel via communication with the at least one other vehicle system comprises communicating in order to affect a change the acceleration of a steerable roadwheel in a lateral direction by signaling a vehicle steering system to steer the at least one steerable roadwheel in the lateral direction with respect to a straight-forward bearing.

17. The product of claim 15 wherein changing the acceleration of the at least one steerable roadwheel or the at least one driven roadwheel via communication with the at least one other vehicle system comprises communicating in order to affect a change the acceleration of a driven roadwheel by signaling a vehicle engine system to increase an amount of torque supplied by the vehicle motor to a driven roadwheel.

18. The product of claim 15 wherein the human driver monitoring system is further constructed and arranged to communicate with at least one vehicle system or module for detecting adverse driving environment, and wherein the human driver monitoring system is constructed and arranged to affect a change in the acceleration of the at least one steerable roadwheel or the at least one driven roadwheel via communication with the at least one other vehicle system based at least upon the detection of an adverse driving environment regardless of whether the human driver is determined to be inattentive to the task of driving by the human driver monitoring system.

19. A method comprising:
providing at least one driven and steerable roadwheel constructed and arranged to be driven by torque supplied by a vehicle motor and also to be steered by a steering system, a human driver monitoring system, a driving surface friction estimation system, and a braking system constructed and arranged to brake at least one of the at least one driven or steerable roadwheel;
using the human driver monitoring system to detect that a human driver has become inattentive to the task of driving the vehicle;
using the driving surface friction estimation system to estimate a driving surface friction for at least one of the at least one driven or steerable roadwheel; and,
based at least upon the detection of the inattentiveness of the human driver and the friction estimate for at least one of the at least one driven and steerable roadwheel, changing an acceleration of the at least one driven or steerable roadwheel.

* * * * *